Aug. 14, 1951      B. WALKER      2,563,981
AUTOMOTIVE VEHICLE GAS TANK AND TIRE MOUNTING
Filed Oct. 23, 1946
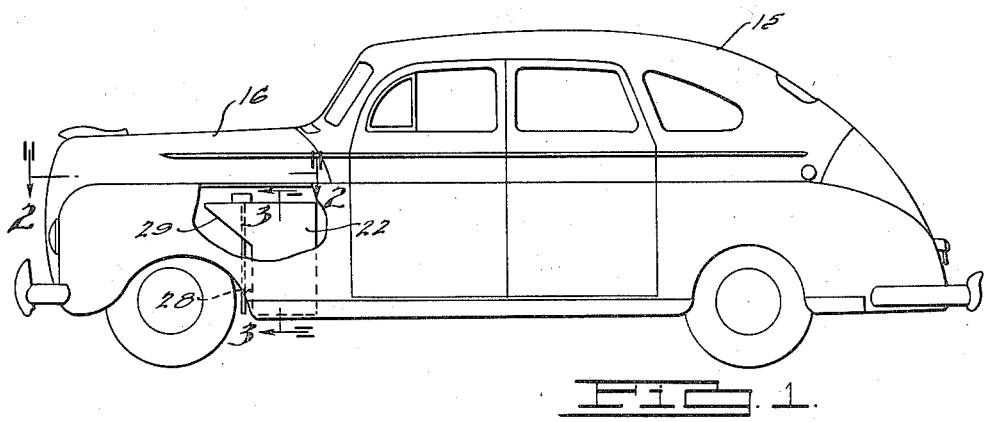
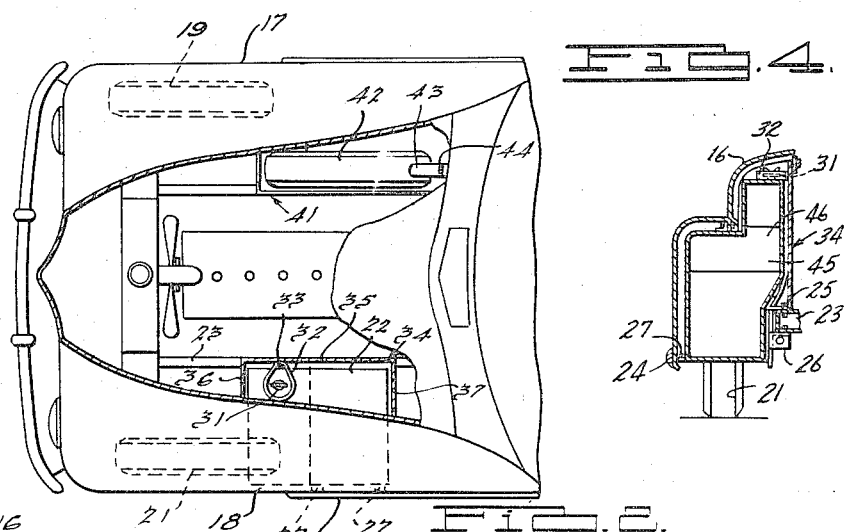
INVENTOR.
Brooks Walker
BY
Harness, Dickey & Pierce
ATTORNEYS.

Patented Aug. 14, 1951

2,563,981

UNITED STATES PATENT OFFICE 2,563,981

AUTOMOTIVE VEHICLE GAS TANK AND TIRE MOUNTING

Brooks Walker, Piedmont, Calif.

Application October 23, 1946, Serial No. 705,089

17 Claims. (Cl. 280—5)

1

This invention relates to automobiles and particularly to compartments therein for the reception and storage of tires, gas tanks and the like.

It has been the practice in the past to support the gas tank under the floor of the rear compartment from which the gasoline is pumped to the carburetor of the engine. The tire was mounted within the rear compartment, thereby reducing substantialy the area available for the storage of luggage and like articles.

The present invention has for its main object the disposition of the spare tire and gas tank in other parts of the body so as to substantially increase the available area in the storage compartment for the reception of luggage and other articles.

A further object of the invention is to mount the gasoline tank beneath the front fender and hood in rear of a front wheel and provide a shroud about the tank and the intake opening which drains the spilled gasoline directly to the ground away from the engine compartment.

A further object of the invention is to mount a tire and gasoline tank for an automotive vehicle on opposite sides of the engine compartment in the forward end of the automobile beneath the hood of the vehicle so as to be accessible when the hood is raised.

Other objects and features of novelty of the invention will be specifically pointed out or will become apparent when referring, for a better understanding of the invention, to the following description taken in conjunction with the accompanying drawings, wherein:

Figure 1 is a broken view in elevation of an automobile body having a gas tank mounted thereon embodying features of this invention;

Fig. 2 is an enlarged broken sectional view of the structure illustrated in Fig. 1, taken on the line 2—2 thereof;

Fig. 3 is a broken sectional view of the structure illustrated in Fig. 1, taken on the line 3—3 thereof, and Fig. 4 is a view of structure, similar to that illustrated in Fig. 3, showing a further form of the invention.

Referring to Figs. 1 to 3 inclusive, an automobile 15 is illustrated of conventional form having a hood 16 and fenders 17 and 18 on either side of the hood extending over front wheels 19 and 21. Beneath the fenders 18, a gasoline tank 22 is secured to the chassis side rail 23 and to the fender 18 and rub rail 24, by suitable attaching brackets 25, 26 and 27. The main portion of the tank 22 is of rectangular form, having a wall 28, adjacent to the front wheel 21, sloping forwardly at 29 to provide a greater tank capacity. A cap 31 covers the inlet opening through which gasoline is pumped into the tank and about which a collar 32 is provided which extends beyond the edge of the tank at 33 to permit any gasoline which overflows from the intake opening to drain from the collar at the extended portion 33 thereof. As a further safety measure to prevent any gasoline from entering the engine compartment, an enclosing shroud 34 extends around the upper portion of the tank beneath the hood to which it is sealed. The shroud comprises a wall 35 extending along the chassis side rail 23 and a forward and rear end wall 36 and 37 having an arcuate edge 38 following the contour of the hood 16. The top edges of the walls 35, 36 and 37 are provided with sealing strips 39, such as felt, rubber and the like, for engaging the under surface of the hood 16 and sealing the tank compartment from the engine compartment. This prevents the fumes and the gasoline from passing from the tank compartment into the engine compartment and eliminates any hazard from fire. The cap 31 is rendered accessible when the hood is raised so that the tank may be filled, and the connection between the tank and the chassis frame 23 and the rub rail 24 provides a reinforced support for the rub rail.

On the opposite side of the engine compartment, a housing 41 is provided for the reception of the spare wheel 42 which is retained in fixed position in any suitable manner such as by a bracket 43 secured to the outer faces of the dash panel by a screw 44. The weight of the tire 42 offsets somewhat the weight of the gasoline and tank 22 on the opposite side of the automobile. The tank is connected in the usual manner by a conduit to a pump which delivers the gasoline to the carburetor of the engine.

In Fig. 4, a tank 45 is illustrated which is of similar construction to that of the tank 22 illustrated in Fig. 3, with the exception that the portion 46 is offset inwardly from the chassis rail 23 and upwardly in the area beneath the hood 16 to provide greater capacity to the tank. Otherwise the construction is the same as that of the tank illustrated in Fig. 3.

It is to be understood that the compartment shown in Fig. 2 for supporting a tire beneath the hood, is rendered accessible when the hood is raised. This is true whether the hood is pivoted at the front or rear, or on either side, as found in the conventional vehicles. It is to be understood that the compartment herein illustrated as supporting a tire may be utilized as a tool box, luggage compartment, or a storage space for other articles. The walls forming the compartment may be extended adjacent to the inside surface of the hood to which is retained out of contact by suitable flexible material, such as rubber, felt and the like, which may be applied to the upper edge of the walls or which is secured to the inner surface of the hood. The flexible material prevents squeaks and noises occurring between the walls and the hood and forms a seal for the compartment.

What is claimed is:

1. In an automobile having front fenders, wheels and a hood disposed therebetween, a fuel tank mounted rearwardly of a front wheel having a portion thereof extending under the hood, the portion extending under the hood having an intake opening sealed by a removable cap, a collar secured to the top of said tank around said opening of a greater dimension than said cap to be spaced therefrom, and means for draining the collar of any fuel spilled about the intake opening.

2. In an automobile having front fenders, wheels and a hood disposed therebetween, a fuel tank mounted rearwardly of a front wheel having a portion thereof extending under the hood, the portion extending under the hood having an intake opening sealed by a removable cap, a collar around said opening spaced outwardly of said cap and extending to one edge of the tank at which an opening is provided for draining any fuel spilled about the intake opening, and a shroud disposed about the portion of the tank under the hood which extends upwardly in spaced relation to the tank and hood.

3. In an automobile having front fenders, wheels and a hood disposed therebetween, a fuel tank mounted rearwardly of a front wheel having a portion thereof extending under the hood, the portion extending under the hood having an intake opening sealed by a removable cap, and a shroud disposed about the portion of the tank under the hood which extends upwardly in spaced relation to the tank and hood.

4. In an automobile having front fenders and wheels and a hood disposed therebetween, a fuel tank mounted rearwardly of a front wheel having a portion thereof extending under the hood, the portion extending under the hood having an intake opening, a shroud disposed about the portion of the tank under the hood which extends upwardly toward the hood, and flexible sealing means provided between the hood and the upper edge of the shroud for sealing the shroud to the hood.

5. In combination with an automobile having a chassis frame, front wheels, fenders over the front wheels, and a hood, of a tank for carrying liquid disposed beneath a fender and the hood and secured to the chassis frame, and bracket means for securing the lower edge of the fender to the outer edge of the tank.

6. In combination with an automobile having a chassis frame, front wheels, fenders over the front wheels, and a hood, of a tank for carrying liquid disposed beneath a fender and the hood and secured to the chassis frame, bracket means for securing the lower edge of the fender to the outer edge of the tank, and a rub rail also secured to the outer edge of the tank by said bracket means.

7. In combination with an automobile having a chassis frame, front wheels, fenders over the front wheels, an engine compartment and a hood, of a fuel tank disposed beneath a fender and the hood and secured to the chassis frame, means for securing the lower edge of the fender to the outer edge of the tank, a rub rail also secured to the outer edge of the tank, the portion of the tank extending under the hood having an intake opening sealed by a removable cap, a collar secured to the tank about the opening spaced outwardly of said cap, and means for draining the collar away from said engine compartment.

8. In combination with an automobile having a chassis frame, front wheels, fenders over the front wheels, and a hood, of a tank disposed beneath a fender and the hood and secured to the chassis frame, means for securing the lower edge of the fender to the outer edge of the tank, a rub rail also secured to the outer edge of the tank, the portion of the tank extending under the hood having an intake opening, and a shroud about the tank portion extending under the hood which projects upwardly substantially in engagement with the under surface of the hood.

9. In combination with an automobile having a chassis frame, front wheels, fenders over the front wheels, an engine compartment and a hood, of a fuel tank disposed beneath a fender and the hood and secured to the chassis frame, means for securing the lower edge of the fender to the outer edge of the tank, a rub rail also secured to the outer edge of the tank, the portion of the tank extending under the hood having an intake opening, and means for conducting fuel spilled around said intake opening away from said engine compartment.

10. In an automobile having a dash panel, front fenders and wheels and a hood disposed therebetween, a fuel tank mounted rearwardly of a front wheel and forwardly of the dash panel having a portion thereof extending under the hood, the portion extending under the hood having an intake opening, and a compartment formed adjacent to the opposite fender beneath the hood forwardly of the dash panel for the reception of the spare tire for aiding in balancing the load on opposite sides of the center line of the automobile.

11. The combination with an automobile having a chassis frame, front wheels, fenders over the front wheels, a dash panel, and a hood, of a fuel tank disposed beneath a fender and the hood forwardly of the dash panel and secured to the chassis frame, additional means for securing the lower edge of the fender to the outer edge of the tank, and a compartment formed adjacent to the opposite fender beneath the hood forwardly of the dash panel for the reception of the spare tire for aiding in balancing the load on opposite sides of the center line of the automobile.

12. The combination in an automobile having a chassis frame, front wheels, fenders over the wheels, and a hood enclosing the compartment between the fenders, of a fuel tank disposed beneath a fender rearwardly of one of the wheels and extended upwardly beneath the hood and inwardly over one edge of the chassis frame, and means for securing the tank to the chassis frame.

13. The combination in an automobile having a chassis frame, front wheels, fenders over the wheels, and a hood enclosing the compartment between the fenders, of a fuel tank disposed beneath a fender rearwardly of one of the wheels and extended upwardly beneath the hood, brackets secured to said tank, and means for securing the tank to the chassis frame by said brackets.

14. The combination in an automobile having a chassis frame, front wheels, fenders over the wheels, and a hood enclosing the compartment between the fenders, of a fuel tank disposed beneath a fender rearwardly of one of the wheels and extended upwardly beneath the hood, means for securing the tank to the chassis frame, said portion of the tank extending upwardly beneath the hood having an intake opening sealed by a removable cap, and means for conducting fuel spilled about said intake opening when the cap is removed away from said compartment.

15. The combination in an automobile having a chassis frame, front wheels, fenders over the wheels, and a hood enclosing the compartment between the fenders, of a fuel tank disposed beneath a fender rearwardly of one of the wheels and extended upwardly beneath the hood and inwardly over one edge of the chassis frame, means for securing the tank to the chassis frame, said portion of the tank extending upwardly beneath the hood having an intake opening sealed by a removable cap, a collar sealed to the top of the tank about said opening and spaced outwardly from said cap, a drain for said collar, and a shroud disposed about the tank projecting inwardly from the fender and extending upwardly substantially into engagement with the under surface of the hood and separating the drain from said compartment.

16. The combination in an automobile having a chassis frame, front wheels, fenders over the wheels, and a hood enclosing the compartment between the fenders, of a fuel tank disposed beneath a fender rearwardly of one of the wheels and extended upwardly beneath the hood and inwardly over one edge of the chassis frame, means for securing the tank to the chassis frame, said portion of the tank extending upwardly beneath the hood having an intake opening, a shroud disposed about the tank projecting inwardly from the fender and extending upwardly substantially into engagement with the under surface of the hood, and flexible sealing means between the hood and the upper edge of the shroud for sealing the tank area defined by the shroud from the interior of the compartment.

17. A vehicle having an engine compartment forwardly of the cowl and dash panel, a closure for said engine compartment, a fuel tank in said compartment forwardly of the cowl and dash panel, an intake opening for said tank accessible only when said closure is in open position, a partition enclosing said tank in spaced relation thereto, and sealing means at the upper edge of said partition for sealing engagement with the closure and separating the tank from the compartment interior.

BROOKS WALKER.

REFERENCES CITED

The following references are of record in the file of this patent:

UNITED STATES PATENTS

| Number | Name | Date |
|---|---|---|
| 745,441 | Hospitalier | Dec. 1, 1903 |
| 1,158,602 | Watts et al. | Nov. 2, 1915 |
| 1,168,636 | Hotchkiss | Jan. 18, 1916 |
| 1,289,871 | Mueller | Dec. 31, 1918 |
| 1,500,646 | Sergardi | July 8, 1924 |
| 1,543,808 | Turnmire | June 30, 1925 |
| 1,629,493 | Ford | May 24, 1927 |
| 1,649,265 | Tetens | Nov. 15, 1927 |
| 1,983,767 | Mueller | Dec. 11, 1934 |
| 2,028,184 | Bergholt | Jan. 21, 1936 |
| 2,104,765 | Saunders | Jan. 11, 1938 |
| 2,131,306 | Walker | Sept. 27, 1938 |
| 2,162,046 | Albinson | June 13, 1939 |
| 2,202,456 | Klavik | May 28, 1940 |
| 2,340,593 | Illsley | Feb. 1, 1944 |

FOREIGN PATENTS

| Number | Country | Date |
|---|---|---|
| 731,787 | France | May 3, 1932 |